No. 636,838. Patented Nov. 14, 1899.
J. L. OWENS.
DRAFT EQUALIZER.
(Application filed June 20, 1899.)
(No Model.) 2 Sheets—Sheet 1.
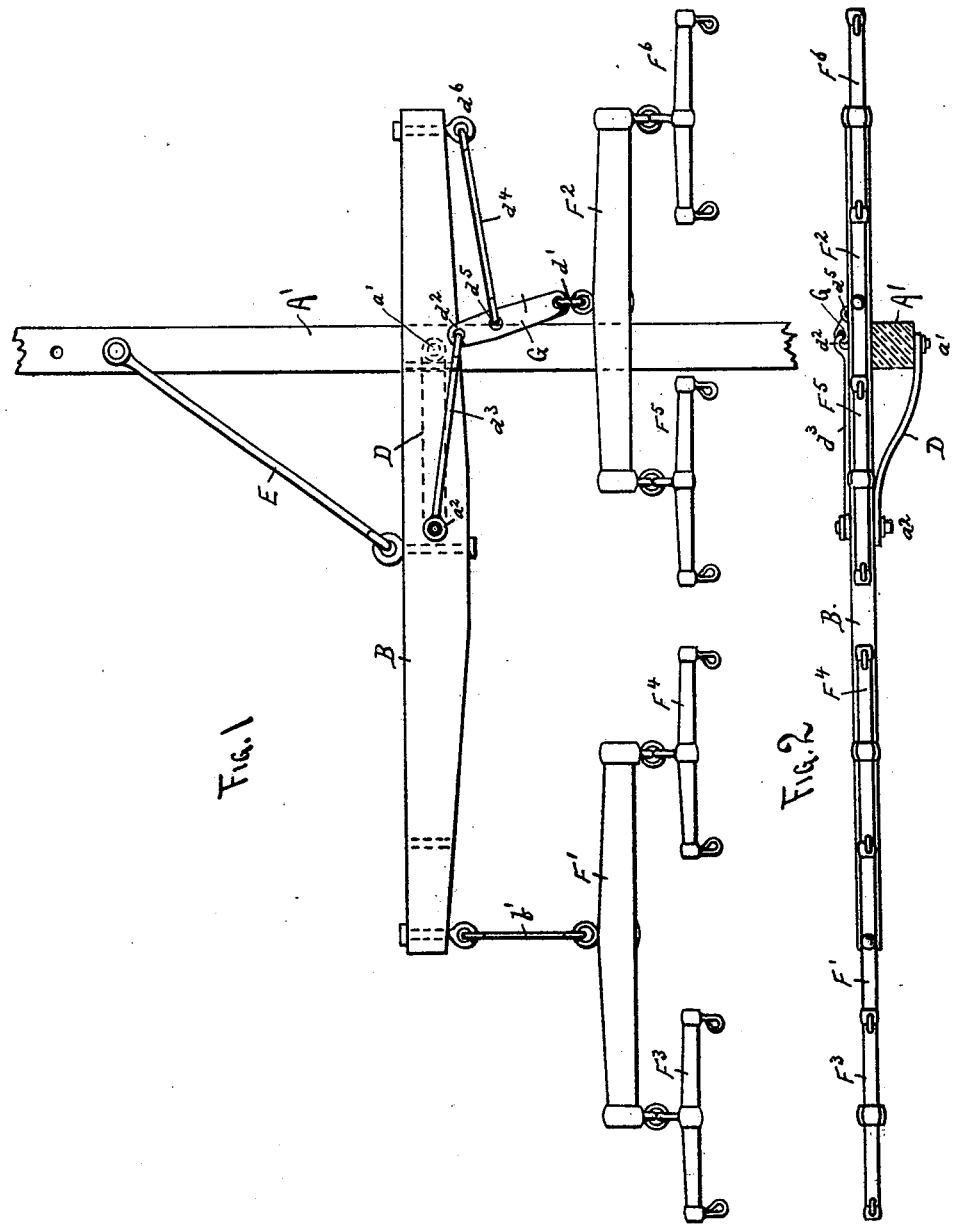
WITNESSES. John L. Owens,
INVENTOR,
BY Charles N. Woodward Atty.

No. 636,838. Patented Nov. 14, 1899.
J. L. OWENS.
DRAFT EQUALIZER.
(Application filed June 20, 1899.)
(No Model.) 2 Sheets—Sheet 2.
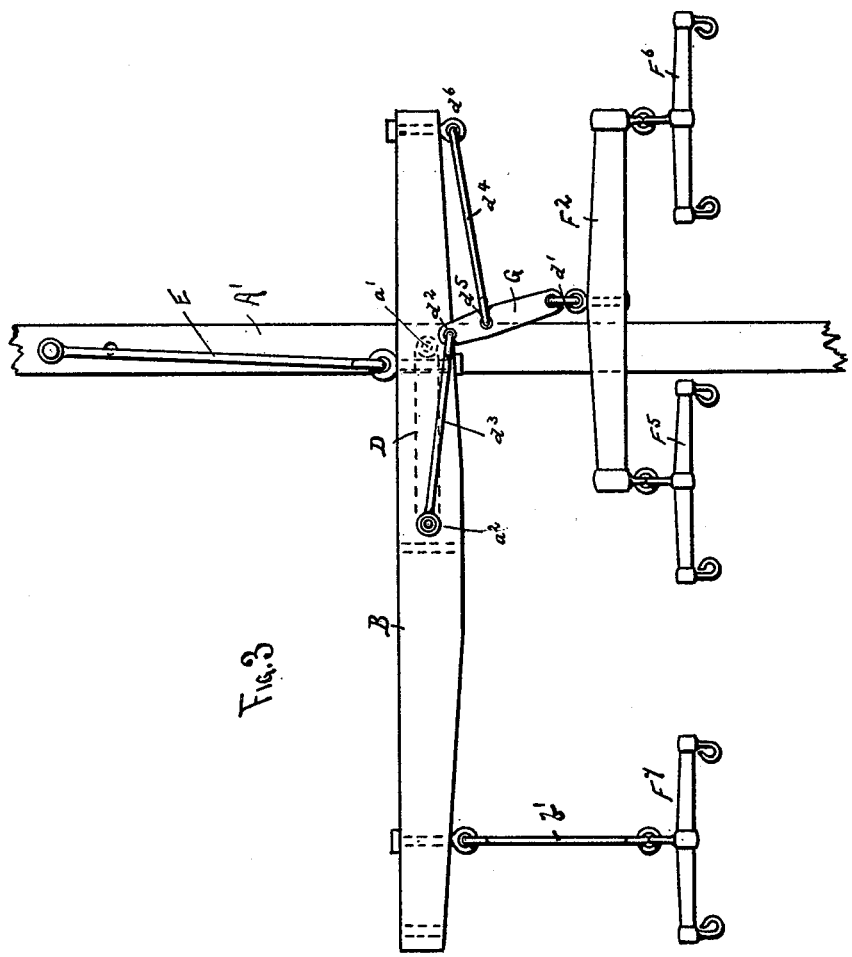

UNITED STATES PATENT OFFICE.

JOHN L. OWENS, OF MINNEAPOLIS, MINNESOTA.

DRAFT-EQUALIZER.

SPECIFICATION forming part of Letters Patent No. 636,838, dated November 14, 1899.

Application filed June 20, 1899. Serial No. 721,210. (No model.)

*To all whom it may concern:*

Be it known that I, JOHN L. OWENS, a citizen of the United States, residing at Minneapolis, in the county of Hennepin and State of Minnesota, have invented certain new and useful Improvements in Three or Four Horse Eveners, of which the following is a specification.

This invention relates to three and four horse eveners employed in connection with harvesters, harrows, and other farm machinery requiring three or more horses; and it consists in the construction, combination, and arrangement of parts as hereinafter shown and described, and specifically pointed out in the claim.

In the drawings, Figure 1 is a plan view, and Fig. 2 is a front view, of the evener and the necessary doubletrees and singletrees connected in place upon a section of a draft-tongue as arranged for a four-horse evener. Fig. 3 is a plan view showing the arrangement for a three-horse evener.

A' is the draft-tongue, which will be attached to the apparatus to be drawn by the horses in the ordinary manner.

B is the main evener-beam lying across the tongue and connected thereto by a link D, the link pivoted by one end at $a'$ to the tongue and by the other end at $a^2$ to the beam B.

The beam B is connected to the tongue in the rear of the link D by a brace-rod E.

F' F$^2$ are the doubletrees, to which the singletrees F$^3$ F$^4$ F$^5$ F$^6$ for the four horses are hitched, the singletree F' being coupled by rod $b'$ to the longer end of the beam B, while the singletree F$^2$ is connected by link $d'$ to a short arm G, as shown. The arm G is connected at one end at $d^2$ by a rod $d^3$ to the beam B, preferably to the pivot $a^2$ of the link D, as shown, and also by a rod $d^4$ from a point $d^5$ between the ends to the shorter end of the beam B, as shown at $d^6$. The point $d^5$ of the connection for the rod $a^4$ on the arm G is nearer the end $d^2$ than the link $d'$, so that an advantage of leverage will exist in favor of the rod $d^4$. By this simple arrangement if the lengths of the different parts are properly proportioned the draft of the two teams will be equalized and the side draft thereby minimized.

When three horses only are employed, the rod E will be transferred to the position shown in Fig. 3, with its point of connection to the beam B about in line with the tongue A and with the doubletree F$^2$ replaced by a singletree F$^7$, which will be connected to the beam B at a point nearer the tongue, as shown in Fig. 3. By this means the leverage is proportioned to the draft of the horses to equalize it.

Having thus described my invention, what I claim as new is—

In a draft-equalizer, a draft-tongue, a beam connected to said tongue by a link or strap, a doubletree, a lever connected by one end to said doubletree, a rod connecting the other end of said lever to said beam intermediate of its length, and a rod connecting the shorter end of said beam to said lever intermediate of its length, and a brace-rod connecting said beam intermediate of its length to said tongue in the rear of said beam.

In testimony whereof I have hereunto set my hand in the presence of two subscribing witnesses.

JOHN L. OWENS.

Witnesses:
M. FENNESSY,
C. N. WOODWARD.